United States Patent
Amigot et al.

(12)

(10) Patent No.: US 6,273,001 B1
(45) Date of Patent: Aug. 14, 2001

(54) PANTOGRAPH FOR TILTING TRAINS

(75) Inventors: Juan Felix Garcia Amigot, Ordizia; Rafael Corta Aranzabal, Eibar; Nicolas Moliner Loriente; Asier Jauregi Benito, both of Donostia, all of (ES)

(73) Assignee: Construcciones Auxiliar de Ferrocarriles S.A. CAF (ES)

( * ) Notice: Subject to any disclaimer, the term of this patent is extended or adjusted under 35 U.S.C. 154(b) by 0 days.

(21) Appl. No.: 09/108,583

(22) Filed: Jul. 1, 1998

(51) Int. Cl.$^7$ ..................................................... B61F 5/10
(52) U.S. Cl. .................................. 105/199.1; 105/199.2; 191/45 R; 191/50; 104/117
(58) Field of Search .............................. 105/199.1, 199.2; 191/45 R, 66, 50; 104/87, 117

(56) References Cited

U.S. PATENT DOCUMENTS

| | | | |
|---|---|---|---|
| 3,712,430 | * | 1/1973 | Charamel ........................ 191/45 R |
| 4,471,175 | * | 9/1984 | Gronlund ........................... 191/66 |
| 5,101,735 | * | 4/1992 | Williams ............................ 104/117 |

FOREIGN PATENT DOCUMENTS

| | | | |
|---|---|---|---|
| 0485273 | | 5/1992 | (EP) . |
| 485273A1 | * | 5/1992 | (EP) ............................. B60L/5/19 |
| WO97/03858 | * | 2/1997 | (EP) ............................. B60L/5/19 |
| 05115104 | * | 10/1991 | (JP) ............................... B60L/5/10 |
| WO 97/03858 | * | 2/1997 | (WO) ............................. B60L/5/19 |

OTHER PUBLICATIONS

Search Report from European Patent Appln. No. 97 50 0111 (Nov. 27, 1997).

English–language Abstract of Japanese Publication No. 05115104, *Patent Abstracts of Japan*, vol. 17, No. 479 (1993).

* cited by examiner

*Primary Examiner*—Stephen Avila
*Assistant Examiner*—Frantz F. Jules
(74) *Attorney, Agent, or Firm*—Ostrolenk, Faber, Gerb & Soffen, LLP (57) ABSTRACT

A device for collecting electric current for a rail vehicle that tilts. The rail vehicle includes a car body having a roof and a bogie beneath the car body. The bogie has a bogie frame and a bolster above the bogie frame and the car body is supported on the bolster. The bolster tilts around an axis with respect to the bogie frame upon tilting of the body. The collecting device includes a platform supported on the roof of the car which is movable transversely to the vehicle access. A pantograph supported on the platform, a flexible connection between the bogie and the pantograph for moving the platform on the pantograph transversely with tilting of the bogie frame, but for not moving the platform along with tilting of the bogie bolster. A motion reducing and amplifying mechanism between the platform and the flexible connection.

19 Claims, 6 Drawing Sheets

PANTOGRAPH FOR TILTING TRAINS

BACKGROUND OF THE INVENTION

This invention refers to the installation of a current collection device on tilting trains. The assembly comprises a pantograph which can move relative to the carbody of the rail vehicle on which it is assembled. The arrangement is such that the pantograph remains unaffected by tilting movements applied to the carbody, and stays practically immobile with respect to the vehicle bogie frame.

SUMMARY OF THE INVENTION

The tendency to shorten ride times in rail transportation has aroused interest in the design of rail vehicles which achieve this aim with no need to build fresh lines for high speed train traffic. This type of train includes the so called tilting trains. A tilting train is a train which uses a built-in device to create an additional superelevation in addition to the cant of the track in curve negotiation. The additional superelevation depends on the running speed and on the characteristics of the curve. This device enables the vehicle to negotiate curves at higher speeds, and also prevents time being lost on deceleration and subsequent acceleration.

Known tilting methods apply a relative rotation between the bogie and the carbody. Electric tilting trains have the additional problem of how to provide for current collection through the pantograph on a vehicle undergoing considerable roll rotations caused by the tilting system. A device must be installed to prevent the pantograph from becoming detached from the overhead catenary by tilting movements.

In recent years a number of types of tilting train have been designed which have solved the problem of electrical current collection connection in a number of ways. The following provides a brief look at the solutions adopted.

a) Pantograph on a non-tilting locomotive. Using this solution, the tilting train consists of a number of tilting passenger cars hauled by a non-tilting locomotive. This locomotive is equipped with the conventional pantograph or pantographs on the roof of the vehicle. The drawbacks to this solution are, firstly, that the drivers of the locomotive undergo extremely high levels of lateral acceleration in comparison to the levels experienced by the passengers, and secondly, the need for a locomotive means that the train consist has quite a number of cars (more than three), or it becomes necessary to haul a non-useful weight if the consist is shorter.

b) Pantograph connected to the bogie structure. This solution is used for electric multiple-unit trainsets, i.e. passenger train units carrying the motor in one or more cars. The pantograph is fitted to the upper section of the vehicle, secured to a structure which is connected to the non-tilting bogie section. This means that the pantograph follows the bogie movements at all times, and remains unaffected by the tilting rotation applied to the carbody of the vehicle. There are a number of drawbacks to this solution. Firstly, the need to set up a structure from the bogie to the roof of the car means reducing useful space in the car, thus reducing passenger space and room for the auxiliary equipments of the train. Secondly, there is a considerable weight increase due to the extra structure which must be fitted for the pantograph. With regard to its advantages, it must be said that fitting a purely mechanical system to secure the pantograph provides the system with a high level of reliability.

c) Pantograph connected to the bogie by means of wire cables. This system keeps the pantograph on approximately the same vertical axis as the bogie, whilst the carbody can tilt below it without exerting an influence on its position. A pantograph using this system is described by the European Patents Office and published as n$^o$ 485,273. According to the description of the aforementioned patent, the pantograph is placed on a rolling platform on the roof of the car. The platform is connected to the bogie frame by a number of wire cables moving along pulleys in the carbody. The wire cables are tensed by drums on the moving platform. This system has two advantages: a substantial weight reduction and increased useful spaces for the carbody. In this case the entire metal structure for the previous solution is replaced by wire cables fitted around the carbody. Drawbacks of this arrangement include the fact that the wire cable configuration not only transmits the tilting movement to the pantograph, but also all movements of the secondary suspension under normal operation. Such movements, in comparison to tilting movements which are quasi-static, come about when the vehicle is in motion and their frequency content is higher. The entire pantograph system is thus subjected to dynamic and quasi-static demands, thereby reducing the lifespan of the entire system.

This invention consists of an installation for the current collection of electric tilting trains, and comprises a pantograph as in the previous description, connected to the bogie by an arrangement of transmission ropes, the basic aim of which is to remove the system disadvantages mentioned above, so that the pantograph receives only tilting movements and not movements related to the secondary suspension.

Other objectives of this system are simplification of the system and ensuring proper operation of the same.

The invention consists of a pantograph fitted to a platform on the roof of a rail vehicle. This platform can move relative to the roof perpendicularly to the axis of the vehicle. It relates to its bogie by means of a flexible transmission rope which transmits tilting movements of the carbody to the platform. The tilting mechanism consists of a kinematic configuration composed of several swing arms which are installed between the bogie frame and the bogie tilting bolster. In this case, the secondary suspension is located above the bolster. The basic features of this installation, in accordance with the invention, are that the flexible transmission rope or ropes are connected to the bogie at points below the suspension elements, and in this way only tilting movements are passed on to the platform, and those due to secondary suspension are not transmitted. These are provided for in the same way as a non-tilting vehicle, by means of the excess width of the pantograph runner shoe.

According to other characteristics of the invention, flexible transmission rope or ropes of the system consist of a fixed sleeve or sheath and an inner core which moves relative to the sheath. The transmission rope or ropes are connected to the platform on which the pantograph is fitted by means of a mechanism to reduce or increase the movement of the core inside the flexible transmission rope or ropes, whilst they are attached to the bogie by anchoring devices assembled between the bogie bolster and the bogie frame, transmitting only tilting movements between the bogie frame and bolster to the core of the transmission rope or ropes.

The core inside the flexible transmission rope can shift in linear movements with respect to its sheath, and work by traction only or by traction and compression. In the case of the former, at least two transmission ropes shall be required, whilst in the latter case one shall be sufficient. The core inside the transmission rope or ropes may also rotate with respect to the sheath and respond to torque demands in one direction or in both. In the former case, at least two transmission shafts shall be required, whilst in the latter case one shall be sufficient.

In accordance with the invention, the platform shall be assembled on four articulated moving bearing on two straight, coplanar guides, arranged transversely on the vehicle roof, in a symmetric position with respect to the central longitudinal section of the roof, with ascending inclination inwards.

The characteristics set out, in addition to others included in the invention, are provided below in more detail using the sketches attached, showing in diagram format and as non-limitative examples, a way in which they could be constructed.

BRIEF DESCRIPTION OF THE DRAWINGS

In the sketches.

DETAILED DESCRIPTION OF THE DRAWINGS

Figure 1:
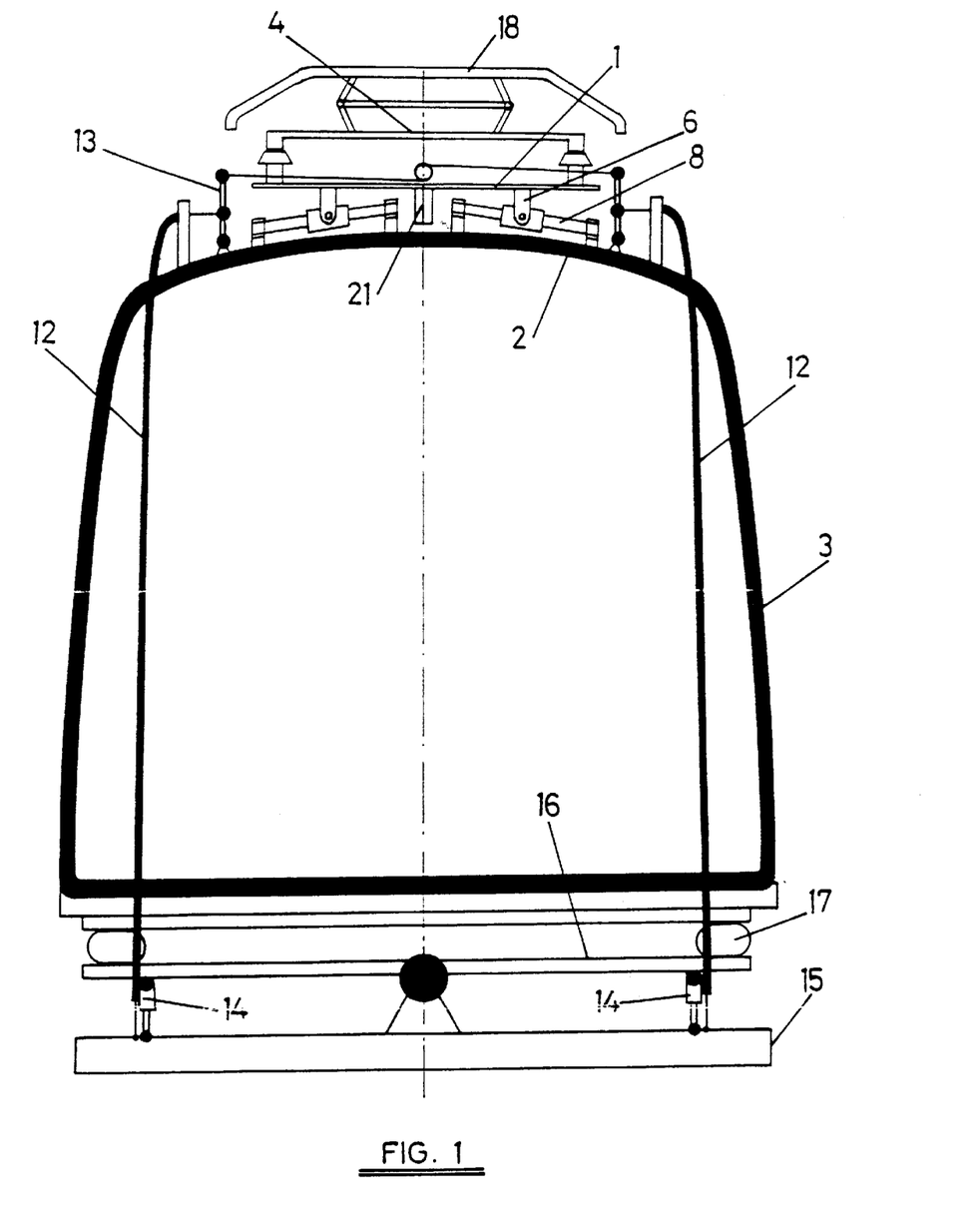
FIG. 1 is a cross section diagram of a rail vehicle in the normal position, fitted with the invention for the current supply connection.
Figure 2:
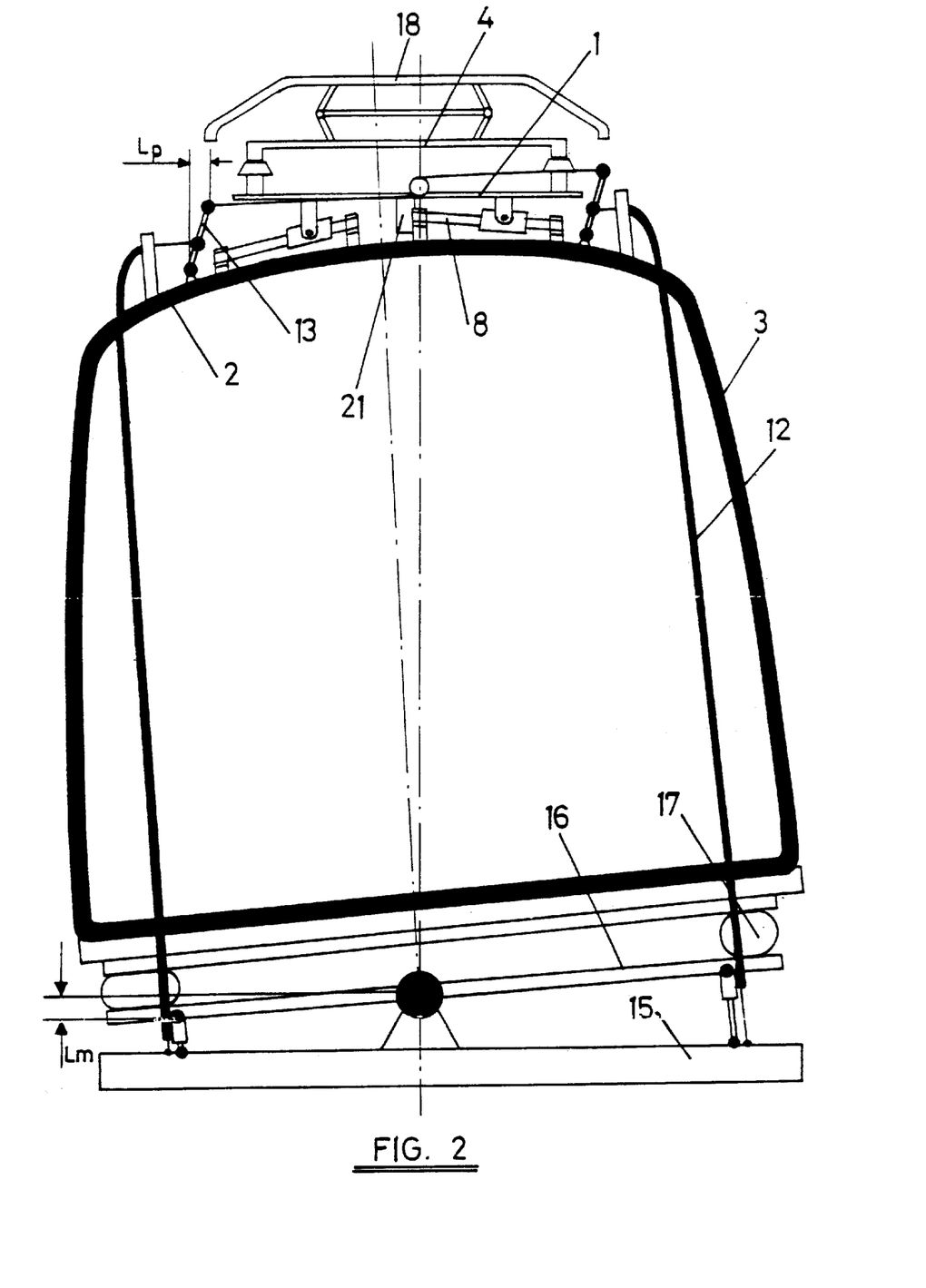
FIG. 2 is a cross section similar to FIG. 1, with the vehicle in the tilted position.

As shown in FIGS. 1 and 2, the invention includes a platform 1 located on the roof 2 of rail vehicle 3. The platform may rotate and move over the roof with respect to the carbody of the rail vehicle 3 using a guiding system, which shall be explained below with reference to FIGS. 3 and 4. Pantograph 4 is fitted to platform 1 with all its components.

Figure 3:
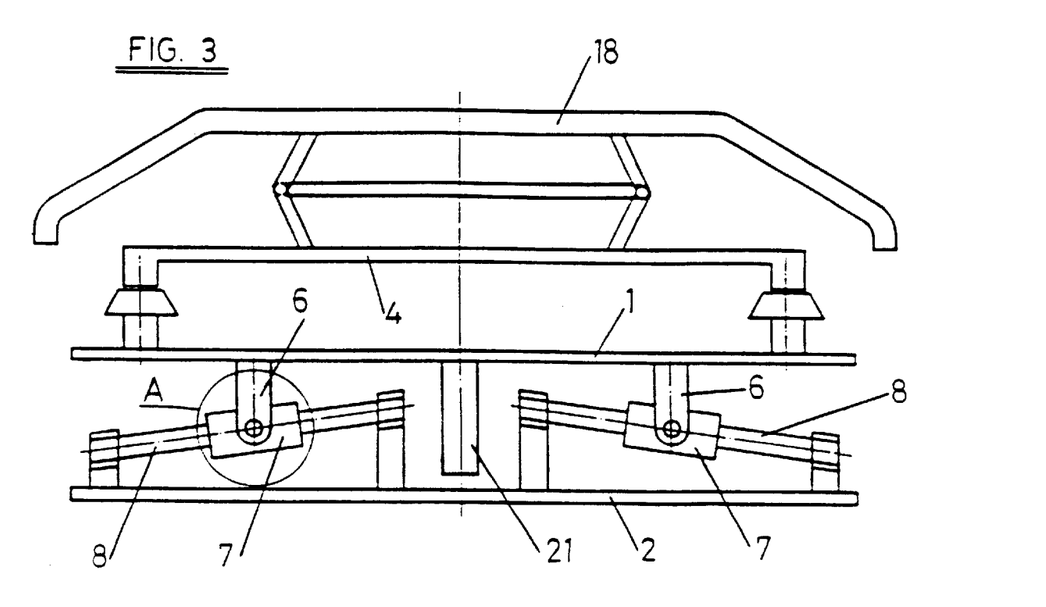
FIG. 3 shows a front view of the pantograph belonging to the invention.

As better illustrated in FIG. 3, platform 1 has lower arms 6 which are hinged to their respective movable bearings 7 on straight guides 8 fitted to the vehicle roof 2.

Figure 4:
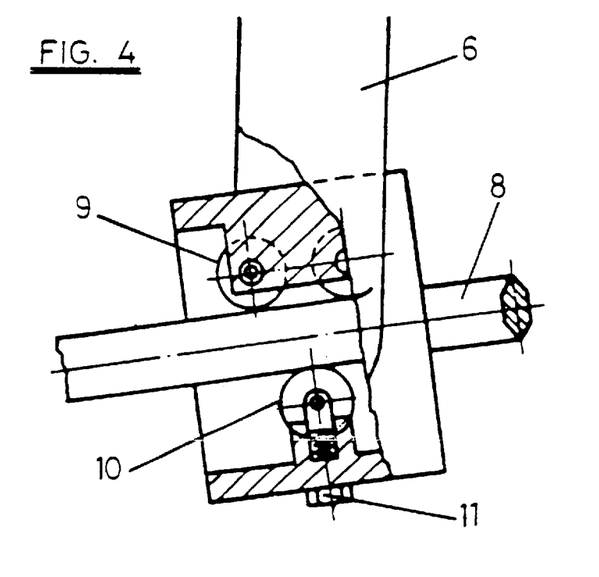
FIG. 4 shows detail A of FIG. 3, on a larger scale an in partial cross section.

The bearings 7, as shown in FIG. 4, may include upper rollers 9 and lower rollers 10 resting on and rolling over the guides 8. The lower roller 10 may be assembled on a shifting rod perpendicular to guide 8 the position of which may be adjusted using a preload screw 11.

As shown in FIGS. 1 and 2, the invention also includes one or more flexible transmission ropes 12 connected to the pantograph platform 1 via a reducer/multiplier linkage 13. Connection of the transmission ropes to the vehicle bogie is made by anchoring devices 14 fixed between the bogie frame 15 and the bogie bolster 16—the latter contains a number of components belonging to the suspension 17.

This arrangement makes the movement of the platform 1, crossways to the longitudinal axis of the vehicle, proportional to the relative rotation between the bogie bolster 16 and the bogie frame 15. In this way, only tilting movements and not movements associated with the secondary suspension 17 are transmitted, as in the case of a non-tilting vehicle, these latter movements shall be accommodated by the excess width of the pantograph runner shoe 18, FIG. 3.

The flexible transmission rope or ropes 12 shall consist of a sheath or sleeve, and a core which is free to move around with respect to the sheath. The transmission rope or ropes shall be flexible so that they may be run through the structure of the train and adapt to the space available and to relative movements between the vehicle's carbody 3 and the bogie bolster 16 which occur due to the flexibility of the suspension 17. Their function shall be to convert the tilt roll movement between the bogie frame 15 and the bogie bolster 16 into a relative movement between the pantograph platform 1 and the vehicle roof 2. This movement may be transmitted in two different ways by means of flexible transmission rope, depending on the nature or construction of the same.

For example, a shifting flexible transmission rope could be used. For this kind of arrangement the inner core moves longitudinally with respect to the external sheath from end to end. On the other hand, a rotating flexible transmission shaft could also be used, where the core of the transmission shaft would rotate with regard to the external sheath.

In the case of a shifting flexible transmission rope, the core can work with pull effort demands only, or pulling and pushing. In the first case at least two transmission rope would have to be fitted, as shown in FIGS. 1 and 2, so that each one only accommodates pulling demands in one single direction, and in the second case only one flexible transmission rope would be required.

In the same way, in the case of rotating flexible transmission shafts, the core can work with demands for torque in one or two directions of rotation. In the first case, two flexible transmission shafts would have to be fitted, whilst in the second case a single flexible transmission shaft would be required.

In order to improve reliability of the system, duplicate flexible transmission ropes or shafts could be advisable.

Since the movements of the pantograph 4 must be in proportion to bogie movements, there must be reducer/multiplier linkage 13 for shifting movement or rotation, in order to achieve suitable ratios of shift/rotation reduction or amplification.

Figures 5, 6:
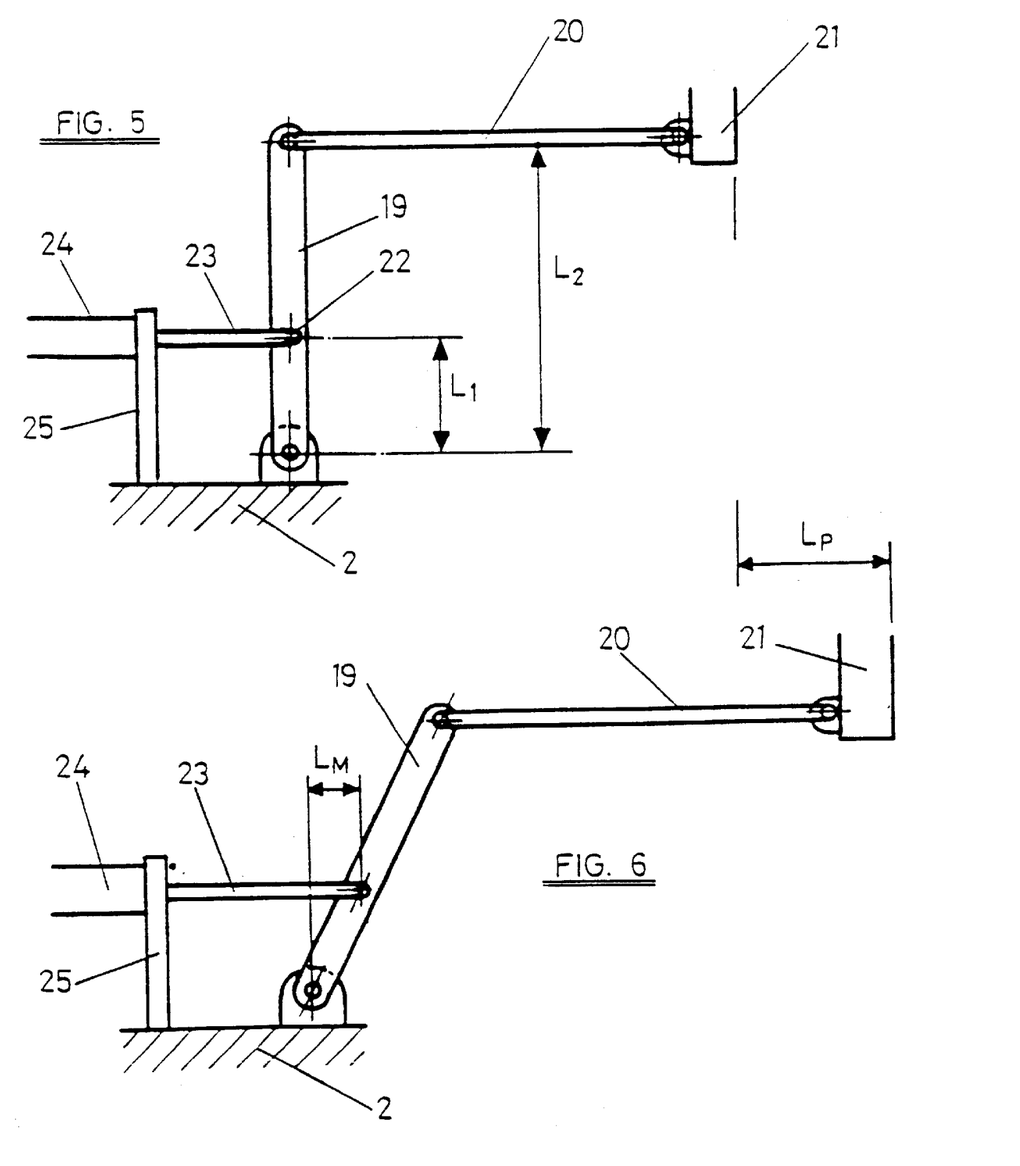
FIG. 5 shows a reduce/multiplier mechanism for connecting the flexible transmission rope and the pantograph platform, illustrating the status of the device as shown by the position of the vehicle in FIG. 1. In this case, the rope transmits linear displacements.
FIG. 6 is a similar view to FIG. 5, showing the mechanism in the status of the same when the vehicle is in the position shown in FIG. 2.

In the case of using a reductor/multiplier linkage for shifting movements, the mechanism may consist, as shown in FIGS. 5 and 6, of a lever 19 hinged to the vehicle roof 2 at one end, and to a rod 20 at the other. The free end of the rod is also fastened to a central bracket 21 fixed on the platform 1 on which the pantograph rests. An intermediate point 22 on lever 19 is the connection point for the core 23 moving inside the flexible transmission rope or ropes 12, whilst the sheath 24 of the transmission ropes is fastened to the roof of the vehicle 2 by a supporting bracket 25. When the core 23 lengthens or shortens by $L_M$, the lever 19 rotates and causes the rod 20 to move along a length $L_1$, with respect to the roof of the vehicle 2. Suitable selection of articulation point 22 for the core 23 on the lever 19 determines the amplification factor applied to $L_M$:

$$L_P = (L_2/L_1) * L_M$$

Figure 10:
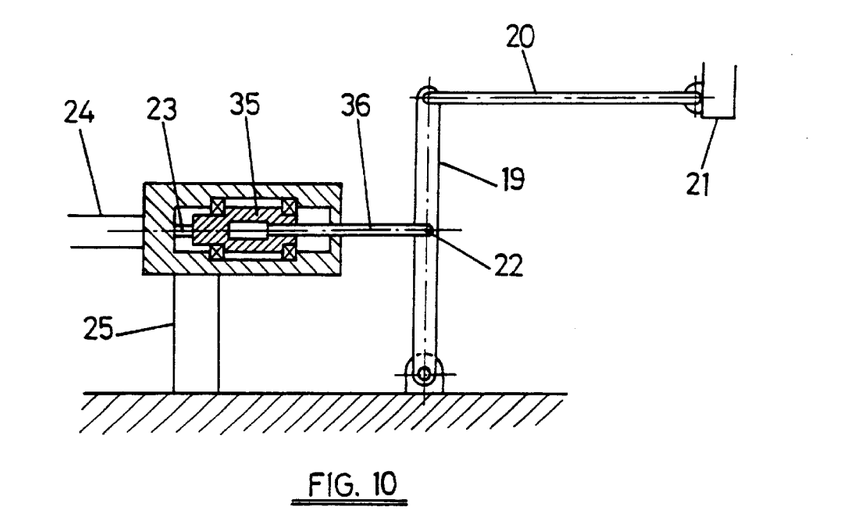
FIG. 10 shows a reducer/multiplier mechanism, similar to the represented one in FIG. 5, for connecting the flexible transmission shaft and the pantograph platform, illustrating the status of the device as shown by the position of the vehicle in FIG. 1. In this case, the shaft transmits a rotational movement.

In the case of using a reductor/multiplier linkage for rotational movement, the mechanism may consist, as shown in FIG. 10, of a device similar to the represented one in FIG. 5, in which a roller screw has been added to convert rotational movement of the core 23 of the flexible transmission shaft 12 in a linear displacement of the rod 36. An end of the rod 36 is connected to the intermediate point 22 of the lever 19, and the other end is connected to the screw of the roller screw. A rotation of the nut 35 of the roller screw causes the screw of the rod 36 to move along. When the core 23 of the flexible transmission shaft is rotating together with the nut 35, the rod 36 lengthens or shortens by $L_M$.

The amplification factor applied to each vehicle shall depend on the geometric relationship between the relative bogie/carbody/pantograph movements.

Figure 7:
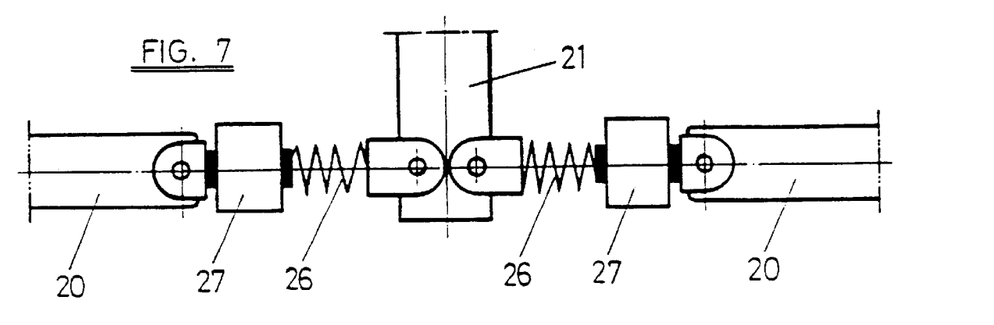
FIG. 7 shows a tautening device for connecting the core inside the flexible transmission ropes to the pantograph platform.

When there are two or more flexible transmission ropes 12, as in FIG. 1, connection of rod 20, in FIG. 5, to the central bracket 21 of the platform 1 may be carried out using a tautening device as shown in FIG. 7. This consists of an elastic tensing device 26 and a conventional centring device 27, which are arranged in series. Using this arrangement in the case of shifting (not rotating) flexible transmission ropes, the core of the transmission ropes shall always work pulling or by traction, and in the case of rotating flexible transmission shafts, the core shall always work with torque in the same direction. Moreover, this tensing device would absorb the differences in movement between the ropes during travelling of the platform 1.

Figure 8:
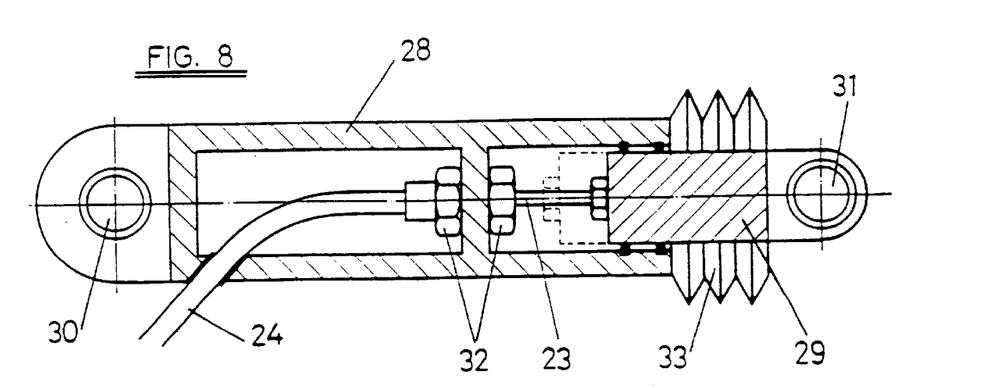
FIG. 8 shows a diametral section of an anchoring device for securing the flexible transmission rope to the bogie.

FIG. 8 shows a possible arrangement of the anchoring device 14 to the bogie for the flexible transmission ropes 12. The device consists of a casing 28 and a rod 29, both of which are coupled and can move telescopically between each other. The casing 28 and the rod 29 feature articulations 30 and 31 for connection to the bogie frame 15 and bogie bolster 16. The sheath of the flexible transmission rope 24 is anchored by nuts 32 to casing 28, whilst the core 23 inside the flexible transmission rope is attached to rod 29. This device may be used to transmit the tilting movement between the bogie frame 15 and the bogie bolster 16 to the core 23 of the flexible transmission rope.

Figure 9:
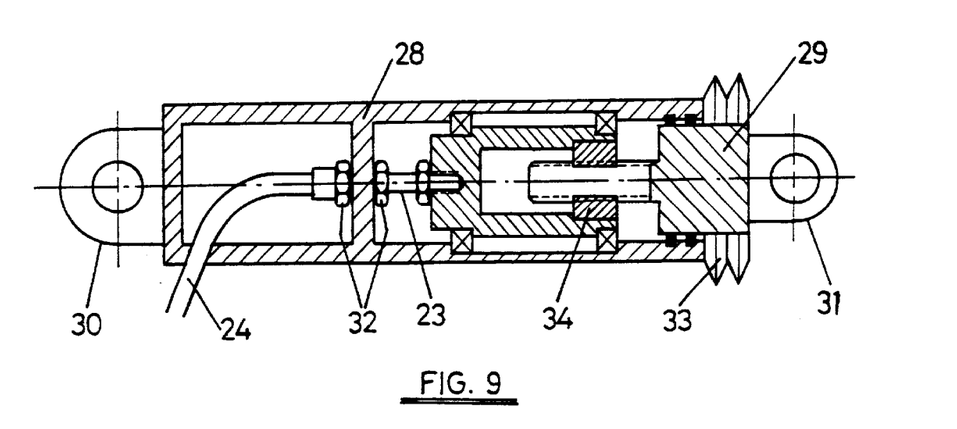
FIG. 9 shows a diametral section of an anchoring device, similar to the represented one in FIG. 8, for securing, in this case, the flexible transmission shaft to the bogie.

FIG. 9 shows a possible arrangement of the anchoring device 14 to the bogie for the flexible transmission shafts. The mechanism may consist of a device similar to the represented one in FIG. 8, in which a roller screw has been added to convert rotational movement of the core 23 of the flexible transmission shaft 12 in a linear displacement of the rod 29. This device consists of a casing 28 and a rod 29 screwed in a nut 34. This nut is anchored to the core 23 of the flexible transmission shaft and both rotate the same angle. The casing 28 and the rod 29 feature articulations 30 and 31 for connection to the bogie frame 15 and the bogie bolster 16. The sheath 24 of the flexible transmission shaft is anchored by nuts 32 to casing 28, whilst the core 23 inside the flexible transmission shaft it attached to the nut 34. This device may be used to transmit the tilting movement between the bogie frame 15 and the bogie bolster 16 to the core 23 of the flexible transmission shaft.

Using this system, when a tilting movement causes the bogie bolster 16 to incline itself with respect to the bogie frame 15, for example moving from the position shown in FIG. 1 to the position shown in FIG. 2, the anchoring device 14 lengthens (or shortens depending on the direction of roll), and the core 23 belonging to the flexible transmission rope 12 moves along a length $L_M$ with respect to the sheath 24 of the flexible transmission rope. On the upper section of the system (roof), the flexible transmission rope, using the reducer/multiplier linkage 13, transforms the relative movement $L_M$ of the flexible rope into a relative equivalent travelling of the pantograph platform 1/vehicle roof 2, shown as $L_P$ on FIGS. 5 and 6, so that the pantograph platform 1 remains approximately in its centered position with respect to the bogie, rotating and moving on the straight guides 8, as in FIG. 3, by means of the articulated bearings 7. When the vehicle returns to the position shown in FIG. 1, the movements described shall be in the opposite direction.

What is claimed is:

1. A device for collecting electric current located on a rail vehicle that tilts, wherein the rail vehicle includes a car body having a roof, a bogie beneath the car body, the bogie having a bogie frame and having a bolster above the bogie frame, the car body being supported on the bolster, and the bolster tilting around an axis extending longitudinally of the vehicle and tilting with respect to the bogie frame upon tilting of the car body;

the device for collecting current comprising:
a platform supported on the roof of the car body and the platform being movable transversely with respect to the longitudinal axis of the vehicle;
a pantograph supported on the platform for movement along with the platform;
at least one flexible connection extending between the bogie and the pantograph on the roof, the flexible connection being out of contact with the car body for isolating the pantograph transverse movement from the displacement caused by the tilting between the car body and the bogie frame and for isolating the pantograph from tilting along with the tilting of the bolster, the car body and the roof of the car body, and for moving the platform and the pantograph transversely across the roof of the car body along with tilting of the bogie frame but not along with tilting of the bogie bolster; and
a motion reducing/amplifying mechanism connected between the platform and the flexible connection and being adapted for selectively reducing or increasing the transverse movement of the platform and of the pantograph thereon in response to tilting of the bogie with respect to the car body; and the flexible connection causing transverse motion of the platform, at a selected reduction/amplification selected by the manner of connecting the flexible connection to the reducing/amplifying mechanism at the platform.

2. The device of claim 1, wherein the flexible connection comprises a flexible transmission rope connected between the bogie frame and the platform.

3. The device of claim 1, wherein the flexible connection comprises a fixed sheath and a flexible core which extends through and is movable with respect to the fixed sheath and is connected between the bogie frame and the platform.

4. The device of claim 3, wherein the core is rotatable with respect to the sheath and a further connection between the core and the platform for converting the rotation of the core into movement of the platform in one or the other transverse direction depending upon the rotation direction of the core.

5. The device of claim 3, wherein the sheath is connected between the bogie bolster and the roof of the vehicle.

6. The device of claim 5, wherein the core is linearly movable with respect to the sheath.

7. The device of claim 5, wherein the car body has an exterior and the sheath passes inside the exterior of the car body as the sheath extends between the bogie and the roof of the vehicle.

8. The device of claim 3, further comprising an anchoring device on the bogie between the bogie frame and the bogie bolster, wherein the core of the flexible connection is connected with the bogie frame while the sheath of the flexible connection is connected with the bogie bolster.

9. The device of claim 2, wherein the reducing/amplifying mechanism comprises a lever having a first connection articulated to the roof of the car body, a connecting rod connected to the lever at a second connection away from the first connection of the lever to the roof of the vehicle and the connecting rod also being connected to the platform, whereby swinging of the lever with respect to the roof of the vehicle moves the connecting rod to move the platform transversely of the roof of the vehicle;

the flexible rope being connected at a third location of the lever intermediate the first and second connections to the lever.

10. The device of claim 9, further comprising a support bracket on the roof of the vehicle;

the flexible connection comprises a fixed sheath; the rope extends through the fixed sheath and serves as a core connected between the bogie frame and the platform;

the sheath of the flexible connection is connected to the support bracket on the roof of the vehicle.

11. The device of claim 9, further comprising a tensioning device between the connecting rod and the platform.

12. The device of claim 11, wherein the tensioning device comprises a tensor and a centering device connected in series between the connected rod and the platform.

13. The device of claim 1, wherein the roof has center transversely with respect to the longitudinal axis of the vehicle, and the device further comprises a platform guide on and extending transversely across the roof and being inclined downwardly outward from the center of the roof;

an articulated bearing for the guide on the platform and supported on the guide, the bearing being movable along the guide as the platform is moved by the flexible connection to move the platform along the guide.

14. The device of claim 13, wherein the platform guides are straight.

15. The device of claim 13, wherein there are four of the guides, each extending transversely across the roof and each being inclined downwardly outward from the center of the roof and toward opposite sides of the roof, two of the guides to one of the opposite sides of the roof and two of the guides to the other opposite side of the roof;

there is a respective one of the articulated bearings located on the platform and engaging each of the guides, each of the articulated bearings and the respective guide engaged thereby being so oriented that as the bearings travel along the respective guides, the bearings tilt the platform as the car body tilts and tilts the guide.

16. The device of claim 1, wherein the flexible connection comprises a flexible transmission rope connected between the bogie frame and the platform and comprises a fixed sheath, and the flexible transmission rope extends through the fixed sheath and serves as a core connected between the bogie frame and the platform;

an anchoring device on the bogie between the bogie frame and the bogie bolster, wherein the core of the flexible connection is connected with the bogie frame while the sheath thereof is connected with the bogie bolster.

17. The device of claim 16, wherein the anchoring device comprises a casing connected with the bogie bolster and a rod connected with the bogie frame and the rod is movable in and with respect to the casing; and the sheath is connected to the casing and the core is connected with the rod.

18. The device of claim 1, wherein the bogie has opposite lateral sides spaced apart transversely to the longitudinal axis of the vehicle, and the device further comprises therein a respective one of the flexible connections connected to each lateral side of the bogie and also connected to the respective lateral side of the platform and each flexible connection applying tension between the bogie and the platform.

19. The device of claim 1, wherein the rail vehicle includes a suspension for the care body between the car body and the bogie bolster, whereby the car body may move relative to the bogie bolster and the bogie frame, and the platform being connected with the bogie frame so as not to be affected by movement of the car body on the suspension.

\* \* \* \* \*